United States Patent [15] 3,641,542
Grove et al. [45] Feb. 8, 1972

[54] VALVE APPARATUS HAVING LEAK-DETECTING MEANS

[72] Inventors: Marvin H. Grove; Kee W. Kim; Lyle R. Van Arsdale, all of Houston, Tex.

[73] Assignee: M & J Valve Company, Houston, Tex.

[22] Filed: Mar. 19, 1970

[21] Appl. No.: 21,074

[52] U.S. Cl. ...........................340/238, 137/557, 137/312
[51] Int. Cl. ...................................F16k 25/00, F16k 37/00
[58] Field of Search....................................137/312; 340/238

[56] References Cited

UNITED STATES PATENTS

| | | | |
|---|---|---|---|
| 3,512,546 | 5/1970 | King | 137/312 |
| 3,398,761 | 8/1968 | Grove et al. | 137/312 |
| 3,050,077 | 8/1962 | Wheatley | 137/312 |

Primary Examiner—M. Cary Nelson
Assistant Examiner—Richard Gerard
Attorney—Flehr, Hohbach, Test, Albritton and Herbert

[57] ABSTRACT

Apparatus making use of at least one main flow control valve and having means for determining whether or not the valve is leaking. The valve employs a sealing assembly which seals with respect to the valve working surface of the valve member (e.g., gate) on two spaced concentric areas. Duct means serves to establish communication between the space between the sealing areas and the exterior of the valve. In the event of leakage past the sealing assembly, it can be detected by noting any discharge of fluid through the duct means to the exterior of the valve. In one embodiment the leakage is noted by opening a vent valve adjacent the main valve. In another embodiment the valve can be checked for leakage at a remote station.

5 Claims, 5 Drawing Figures

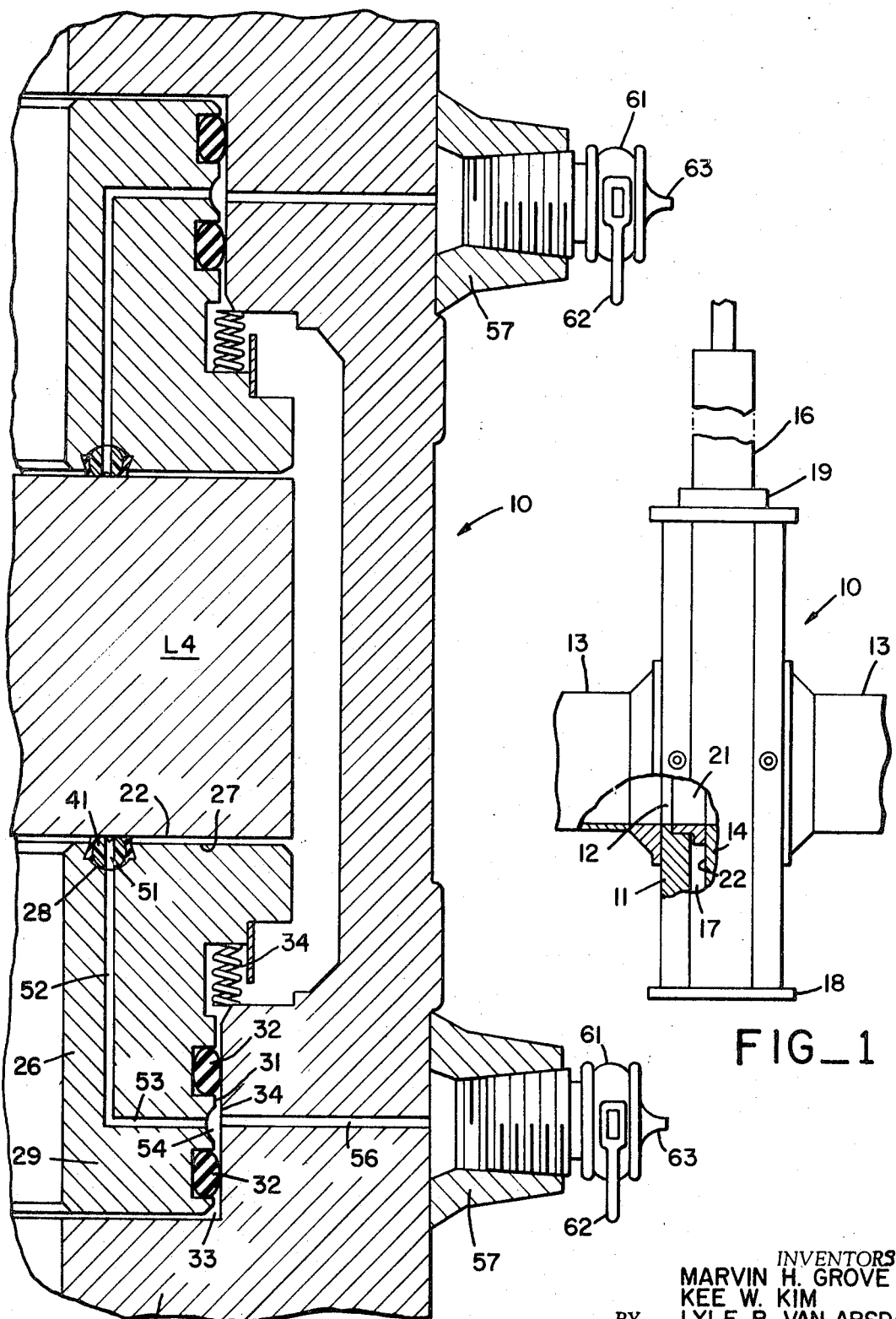

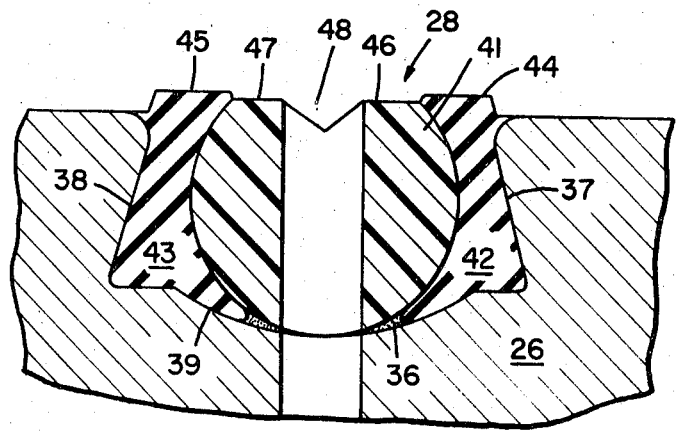
FIG_3
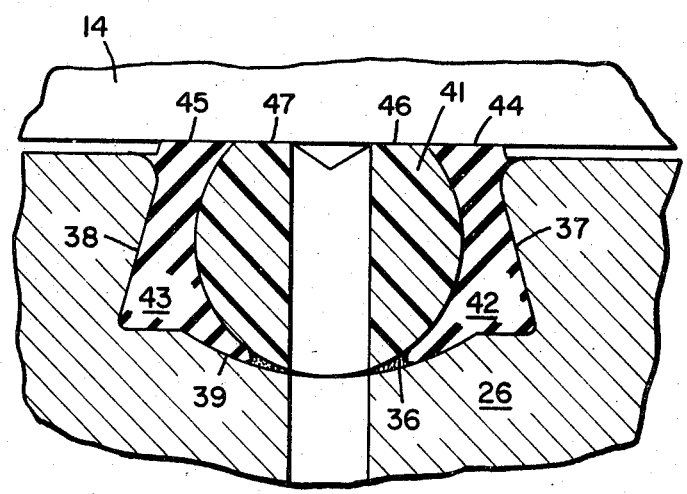
FIG_4
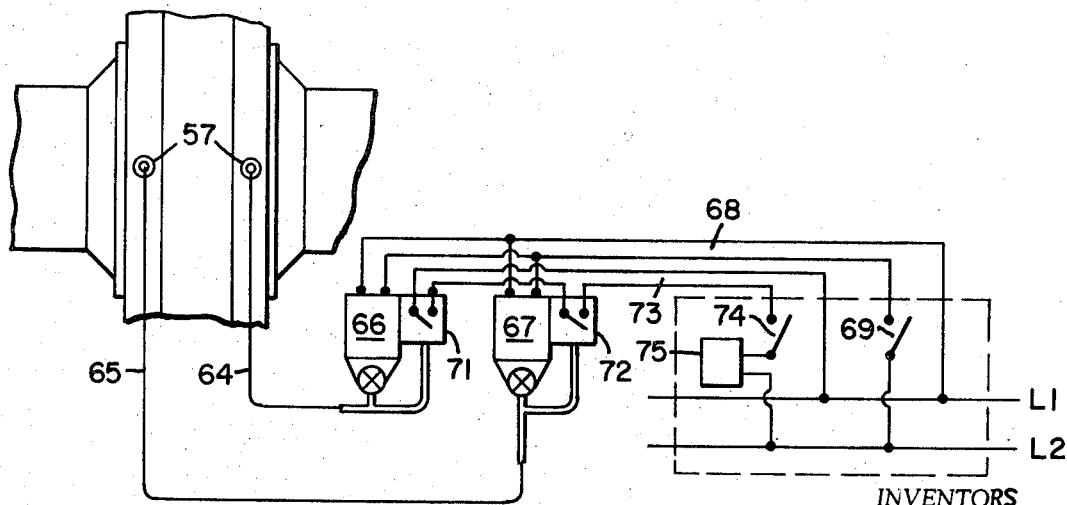
FIG_5

VALVE APPARATUS HAVING LEAK-DETECTING MEANS

BACKGROUND OF THE INVENTION

This invention relates generally to valve apparatus for controlling the flow of various fluids, and particularly to apparatus of this kind which is provided with means for detecting valve leakage.

In various industrial and pipe line systems where valves are installed to control fluid flow, it is important to provide a tight shutoff and be able to check a particular valve or group of valves to determine if any leakage is occurring. By way of example, meter proving systems commonly employ valves for controlling the metering cycle. Any leakage past such valves seriously interferes with metering accuracy. Assuming that the valves employed are of the gate type and are provided with sealing assemblies on the upstream and downstream sides of the gate, it is possible to check leakage by opening a valve connected to the body space to vent the body to atmospheric pressure. If fluid continues to flow through the valve body after venting a leakage is indicated. A leak detector which involves venting the body of the valve to atmospheric pressure is disclosed and claimed in U.S. Pat. No. 3,398,761.

One limiting feature leak detectors of the type disclosed in U.S. Pat. No. 3,398,761 is that they detect leakage only past the upstream sealing assembly, irrespective of whether or not there is any leakage past the downstream sealing assembly. Assuming that the body space of the valve is closed, leakage must occur past both the upstream and downstream sealing assemblies before the valve is actually leaking fluid from the upstream to the downstream side.

Another objection to leak detecting means of the type described in U.S. Pat. No. 3,398,761 is that when the small vent valve connected to the body space is opened, a substantial amount of fluid may be discharged before the pressure of the body space is reduced to atmospheric. Also, if there is substantial volume of leakage past the upstream sealing means, a relatively large amount of fluid may be discharged from the body space before the operator is full/ aware of the leaky condition.

SUMMARY OF THE INVENTION AND OBJECTS

It is an object of the present invention to provide valve apparatus having leak detecting means which can be used to determine whether or not the valve is leaking to the downstream side.

Another object of the invention is to provide apparatus of the above character which under normal conditions will involve the discharge of only relatively small amounts of fluid in checking the valve to determine leakage.

Another object of the invention is to provide apparatus of the above character which facilitates operation from a remote station.

In general, the present invention consists of a valve body having flow passages for connection with associated piping and a valve member within the body movable between open and closed positions relative to the passages. A sealing means surrounds at least one of the flow passages and serves to form a fluidtight seal between the body and the adjacent valve working surface of the valve member. The sealing means is an annular sealing assembly comprising a rigid seat ring carried by the body and sealing means of resilient material carried by one end face of the seat ring. The sealing means is characterized by having spaced concentric areas of sealing contact with the valve working surface of the valve member. Duct means is provided in both the seat ring and the body for establishing fluid communication between the space between the sealing areas and the exterior of the valve. The duct means exterior of the valve is connected to a vent valve to enable venting the space to atmospheric pressure. In one embodiment the vent valve is operated from a remote station and this station also has means which indicates a buildup of pressure in said space after the vent valve has been closed.

BRIEF DESCRIPTION OF THE FIGURES

FIG. 1 is a side elevational view partly in section illustrating a valve of the type with which the present invention may be employed.

FIG. 2 is a detail in section illustrating portions of the sealing assemblies on both the upstream and downstream sides of the valve and the ducts communicating with the same.

FIG. 3 is an enlarged view in section illustrating a suitable construction for the assembly which makes sealing contact with the valve member.

FIG. 4 is a view like FIG. 3 but showing sealing contact with the valve gate.

FIG. 5 is a schematic view illustrating electrically operated vent valves and pressure switches connected between the valve and a remote station for leakage indication.

DESCRIPTION OF THE PREFERRED EMBODIMENTS

FIG. 1 of the drawing illustrates a gate valve suitable for use in the present invention. This gate consists of a body 10 which can be fabricated as by wel;ing from structural steel shapes (e.g., steel plate), with the end walls 11 of the body provided with flow passages 12 which communicate with the piping 13. The gate 14 within the body may be operated manually between full open and closed positions, or may be connected to suitable power operating means such as a hydraulic operator 16. The body space 17 within which the gate 14 is disposed is closed by the bottom closure plate 18 and the upper bonnet assembly 19. The latter provides a seal about the operating rod (not shown). A sealing assembly 21 is carried by one of the end walls and establishes a seal between the body and the adjacent valve working surface 22 of the gate. It is assumed in this instance that at least one such assembly is on the upstream side of the gate. It is common practice to provide sealing assemblies upon both the upstream and downstream sides.

To carry out the present invention a sealing assembly is employed which establishes sealing contact with the valve working surface of the gate along two concentric areas. Such a sealing assembly is disclosed in copending application Ser. No. 17,365 filed Mar. 9, 1970 and may be constructed as shown in FIGS. 2 and 3. In this instance each of the two assemblies consists of a rigid metal seat ring 26 which has its one end face 27 is close proximity with the adjacent valve working surface 22 of the gate. This ring carries on assembly 28 like that shown in FIG. 3, which establishes fluidtight contacts with the valve working surface. The extension portion 29 of the seat ring is machined to provide the exterior cylindrical periphery 31 and grooves for accommodating the seal rings 32 of the resilient O-ring type. The body is machined to provide the recess 33 for accommodating the seat ring. This recessing provides a cylindrical peripheral surface 34 which is slightly larger in diameter than the cylindrical surface 31 of the seat ring, and which is contacted by the O-rings 32. A plurality of circumferentially spaced compression springs 34 serve to urge the seat ring toward the gate.

The assembly 28 shown in FIG. 3 is substantially the same as disclosed in said copending application Ser. No. 17,365 except for the duct means to be presently described. Thus the seat ring is provided with an annular cavity 36 which is defined by the inner and outer peripheral surfaces 37 and 38 and the bottom surface 39. The surfaces 37 and 38 in section are convergent toward the end of the seat ring as illustrated. Within the recess 36 there is a ring 41 which is made of relatively hard resilient material like nylon. Also there are members 42 and 43 which are made of more resilient material, such as suitable synthetic rubber. The members 42 and 43 are normally highly compressed, this being accomplished by the method of assembly. As explained in said application Ser. No. 17,365, the members 42 and 43 may be resilient rubber bands or strips which are applied to the peripheral surfaces 37 and 38 with suitable fluid cement before the nylon ring 41 is inserted into the recess 36. Thereafter additional cement is applied to the surfaces of members 42 and 43, the nylon ring is pressed into the recess between these members whereby the members 42 and 43 are compressed and distorted to somewhat the configuration illustrated in FIG. 3. Thereafter, excess rubber is trimmed from members 42 and 43 and the face of the nylon ring 41 is machined as illustrated. This then provides resilient annular sealing faces 44 and 45 and adjacent areas 46 and 47 on the nylon ring 41. Areas 46 and 47 are shown separated by the annular groove 48. Normally faces 44 and 45 are in a common plane that is offset somewhat beyond the plane of the surfaces 46 and 47 as illustrated in FIG. 3. When pressed against a gate as in FIG. 4, the faces 44 and 45 are compressed a limited amount to bring them into coincidence with the plane of faces 46 and 47, and with the surfaces 44 and 45 establishing fluidtight engagement with the valve working surface. It will be evident that with this assembly, sealing contact with the valve working surface is established on two concentric areas represented by the surfaces 44 and 45. The space between surfaces 44 and 45 (represented by groove 48), or in other words the space between the two areas of sealing contact, is in effect isolated from both the upstream line pressure and the pressure within the body space.

As shown particularly in FIG. 2, duct means is provided whereby the space (i.e., groove 48) between to two sealing areas described above can be placed in communication with the exterior of the valve. Referring again to FIG. 2 the nylon ring 41 is provided with one or more ducts 51 which are in communication with groove 48 and one or more ducts 52 in the metal seat ring 29. Duct 52 connects with one or more radially extending ducts 53 which communicate with the annular space 54 between the two O-ring seals 32. A duct 56 in the adjacent side portion of the body communicates between the space 54 and the exterior fitting 57.

It is a characteristic of the sealing assembly described above that on the upstream side a fluidtight seal is established on the inner sealing area, or in other words, the sealing area of the smaller diameter. This assumes that a pressure differential exists between the upstream line pressure and the body space. If fluid should leak past this sealing area, it will leak past the outer sealing area, assuming that the differential pressures involved are substantial. However, some pressure is required in the space between to two pressure areas for fluid within the space to leak past the outer area. On the downstream side the conditions are reversed. In other words, the pressure holding seal is established by the outer sealing area, and if leakage occurs past this area, it can leak past the inner area. If on the upstream side the leakage is not excessive, it can flow through the ducts 51, 52, 53 and 56 to the exterior of the valve. The same applies to leakage on the downstream side. Thus the discharge of any fluid to the exterior of the valve through one of the fitting 57 indicates a leakage past the corresponding sealing assembly. Normally it is desirable to prevent such flow of fluid from the upstream sealing assemblies by closing the corresponding duct 56 and fitting 57. When it is desired to check the valve to determine if it is leaking, with pressure applied to the upstream side, the duct 56 for the upstream sealing assembly can be opened to observe any discharge of fluid. If no fluid is discharged, other than an initial small amount to reduce the pressure to atmospheric, then the upstream assembly is not leaking. The same test can be made with respect to the downstream seal. In testing the valve in this manner for leakage, it is not necessary to vent the body space to atmospheric pressure, as with the prior apparatus previously described.

As shown in FIG. 2, the fittings 57 are provided with small manually operated vent valves 61. Each valve is provided with an operating handle 62 for easy operation between open and closed positions. When the valve corresponding to the upstream side is opened, the relatively small volume of space represented by groove 48 between the sealing areas and by the ducts, is quickly vented to atmosphere without the discharge of any substantial amount of fluid. Thereafter, any further or continued discharge of fluid indicates leakage.

In addition to employing the construction described above for determining leakage, it is possible to employ the ducts for the introduction of a suitable lubricant. Thus each of the small valves 61 can be provided with a lubricant fitting 63 whereby when the valve is open a lubricant injection gun can be applied to force lubricant under pressure through the ducts and into the groove 48 ring 41. In this connection the sealing assembly described is self-relieving with respect to build up of excessive pressure in the space between the two sealing areas. In other words, pressure developed by the introduction of lubricant into the space between the two sealing areas cannot exceed a certain value, because beyond such pressure the lubricant will escape past the sealing areas.

For remote operation and indication, the arrangement shown in FIG. 5 can be used. In this instance, the two fittings 57 are connected by tubing or piping 64 and 65 to the solenoid-operated vent valves 66 and 67. The solenoid windings are shown connected to a common energizing circuit 68 which is controlled by switch 69. The pipes 64 and 65 also connect with the pressure-operated switches 71 and 72 which have their contacts connected in series with the detecting circuit 73. This circuit may be controlled by the switch 74. Suitable indicating means 75, such as a signal lamp, is in series with circuit 73. The switches 69 and 74 and indicating means 75 are located at a remote station. To determine if the main valve is leaking, the operator at the remote station closes the switch 69 for a short interval to energize the solenoid vent valves 66 and 67, whereby the pipes 64 and 65 are vented to atmosphere. Thereafter, switch 69 is opened and switch 74 closed. If a buildup of pressure occurs in both the pipes 64 and 65, both of the pressure switches 71 and 72 are operated, thus closing their contact to operate the indicator 75. It will be noted in this connection that with the contacts of the pressure switches 71 and 72 in series, a leak indication is not obtained unless there is leakage past both the upstream and downstream sealing assemblies. Such leakage means that the valve is leaking from the upstream to the downstream side. If only the upstream sealing assembly is leaking, but the downstream assembly is not leaking, then one of the pressure switches would not be operated, and the indicator 75 would not be energized.

As previously noted the pressure buildup on groove 48 is limited by the inherent self-relieving action. However, the buildup is sufficient for operating switches 71 and 72.

It will be evident from the foregoing that the present invention has a number of desirable features. Particularly in determining whether or not the sealing assemblies are leaking, it is necessary to vent only a minimum amount of fluid to the atmosphere. In other words, it is not necessary to discharge considerable quantities of fluid from the valve body. One can make a leakage determination individually with respect to the upstream and downstream assemblies. Also one can make a leakage determination with respect to both the upstream and downstream sides in the manner described in connection with FIG. 5. Although the invention is primarily for the purpose of determining possible leakage, it also serves to permit application of lubrication to the sealing areas.

The valve described above has sealing assemblies on both the upstream and downstream sides. Also each assembly has sealing areas which have diameters smaller than the diameter of surface 34. Thus on the upstream side line pressure urges the assembly toward the gate. Also excessive body pressure (above line pressure) urges the assembly away from the gate to permit such pressure to be relieved. On the downstream side the sealing assembly takes the thrust of the gate.

In place of two sealing assemblies, the valve may have one sealing assembly on the upstream side, in which event it is desirable to proportion the seat ring whereby the mean diameter of ring 41 is substantially the same as the diameter of surface 34. This provides a single assembly which will seal against pressure applied in either direction.

While the invention has been described in connection with a valve of the gate type, it can be employed with other types of valves (e.g., plug, ball, plunger, etc.).

We claim:

1. In valve apparatus, a body having flow passages for connection with associated piping, a valve member within the body and movable between open and closed positions relative to the passages, said member having valve working surfaces, and sealing means surrounding each of the passages and serving to form fluidtight seals between the body and valve working surfaces of the valve member on both the upstream and downstream sides of the valve, each of said means including an annular sealing assembly comprising a seat ring and seal means of resilient material carried by one end face of the seat ring, said seal means having spaced concentric areas of sealing contact with the associated valve working surface, duct means in the valve body and the seat rings for establishing fluid communication between the spaces between the sealing areas on both the upstream and downstream sides and the exterior of the valve, electrically operated vent valves connected to each of said duct means exterior of the body, each of said valves serving to vent the associated duct means to the atmosphere or close the same, a pressure operated electrical switch connected to each of said duct means, an electrical energizing circuit for the vent valve extending to a remote operating station, switch means at the remote operating station for closing said energizing circuit to effect conjoint operation of the vent valves, an indicating circuit extending from the pressure operated switches to the remote station, an indicator at the remote station serving to indicate closing of said indicating circuit, said indicating circuit including the contacts of each of said pressure operated switches in series whereby a buildup of pressure in the duct means of both the upstream and downstream assemblies is required to close said indicating circuit to effect an indication at the remote station.

2. In valve apparatus, a body having flow passages for connection with associated piping, a valve member movable within the body between open and closed positions relative to the flow passages, said member having a valve working surface, at least one seat ring movably carried by the body and surround one of the flow passages, one face of the seat ring being disposed adjacent the valve working surface, resilient sealing means carried by said seat ring, the seat ring being recessed to accommodate the sealing means, said sealing means comprising inner and outer concentric and radially spaced annular members made of resilient material and annular means interposed between the resilient members serving to retain the same on the seat ring with radially spaced edge faces of the members projecting from said one face of the seat ring for sealing contact with the valve working surface on radially spaced areas, the radially opposed peripheral surfaces of said members being supported by said annular means whereby the inner resilient member seals against pressure differential applied from said one flow passage and the outer annular member seals against pressure differential applied from the space surrounding the seat ring, said resilient members being self-relieving with respect to a predetermined pressure in the space between said annular areas which applies pressure differential to one or the other of the resilient members, said predetermined pressure being substantially less than that of the flow passage fluid pressure, and duct means in the seat ring and in the valve body for establishing fluid connection with the space between said sealing areas and the exterior of the valve.

3. A valve construction as in claim 2 together with a vent valve exterior of the valve body for maintaining said duct means closed or for venting the same to the atmosphere.

4. Apparatus as in claim 2 together with an electrically operated vent valve in communication with the exterior end of said duct means and serving to vent said duct means to the atmosphere or to close the same, a pressure operated electrical switch also in communication with said duct means exterior of the valve and electrical circuitry extending to a remote station, said circuitry including switch means at the remote station for energizing the vent valve, an indicating circuit connected to the contacts of the pressure operated switch and extending to the remote station, and an indicator at the remote station in series with said last named circuit, said indicating circuit being closed by closure of the contacts of said pressure operated switch to energize the indicating means at the remote station.

5. Apparatus as in claim 2 together with an additional seat ring movably carried by the body and surrounding the other one of said flow passages, and resilient sealing means carried by said last named seat ring having a construction as defined for said first named seat ring, duct means in the last named seat ring and the valve body for establishing fluid connection with the space between the sealing areas of said second sealing means and the exterior of the valve, two electrically operated vent valves exterior of the valve and in communication with the exterior ends of said duct means, said vent valves serving to vent said duct means to the atmosphere or close the same, pressure operated electrical switches also in communication with both said duct means exterior of the valve, and electrical circuitry extending to a remote operating station, said circuitry including switch means at the remote station for energizing both of the vent valves, an indicating circuit connected to the contacts of both of the pressure operated switches and extending to the remote station, and an indicator at the remote station in series with said last-named circuit, said indicating circuit being closed by closure of the contacts of both of said pressure operated switches to energize the indicating means at the remote station.

* * * * *